US012567713B2

(12) United States Patent
Hori et al.

(10) Patent No.: US 12,567,713 B2
(45) Date of Patent: Mar. 3, 2026

(54) DISCHARGE ELECTRODE, METHOD FOR MANUFACTURING ANODE, AND METHOD FOR MANUFACTURING ELECTRONIC DEVICES

(71) Applicant: Gigaphoton Inc., Tochigi (JP)

(72) Inventors: Tsukasa Hori, Oyama (JP); Yasuaki Kiyota, Oyama (JP); Hisakazu Katsuumi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 530 days.

(21) Appl. No.: 18/311,949

(22) Filed: May 4, 2023

(65) Prior Publication Data

US 2023/0275386 A1    Aug. 31, 2023

Related U.S. Application Data

(63) Continuation of application No. PCT/JP2020/048102, filed on Dec. 23, 2020.

(51) Int. Cl.
*H01S 3/038* (2006.01)
*H01S 3/223* (2006.01)

(52) U.S. Cl.
CPC .......... *H01S 3/0385* (2013.01); *H01S 3/0381* (2013.01); *H01S 3/0388* (2013.01); *H01S 3/223* (2013.01)

(58) Field of Classification Search
CPC .... H01S 3/0381; H01S 3/0382; H01S 3/0385; H01S 3/0388
See application file for complete search history.

(56) References Cited

U.S. PATENT DOCUMENTS 4,317,067  A    2/1982  Fitzsimmons et al.
5,187,716  A    2/1993  Haruta et al.
(Continued)

FOREIGN PATENT DOCUMENTS

DE        4401892 A1  *  7/1995  .......... H01S 3/0385
JP     H04-218985 A     8/1992
(Continued)

OTHER PUBLICATIONS

International Search Report issued in PCT/JP2020/048102; mailed Mar. 9, 2021.
(Continued)

*Primary Examiner* — James A Menefee
(74) *Attorney, Agent, or Firm* — Studebaker Brackett PLLC

(57) ABSTRACT

Discharge electrodes include a cathode and an anode. The anode is disposed to face the cathode in a discharge direction perpendicular to a longitudinal direction of the cathode, and includes an electrode base 1, and a coating layer that covers a portion of a surface of the electrode base. First corners in a cross section perpendicular to the longitudinal direction connect first straight sections formed of first side surfaces that are side surfaces of the electrode base to a first curved section formed of a first discharge surface that is a discharge surface of the electrode base. The first corners are closer to the cathode in the discharge direction than second corners connecting second straight sections formed of second side surfaces that are side surfaces of the coating layer to a second curved section formed of a second discharge surface that is a discharge surface of the coating layer.

20 Claims, 10 Drawing Sheets

(56)                References Cited

U.S. PATENT DOCUMENTS

| | | | | |
|---|---|---|---|---|
| 5,220,575 | A * | 6/1993 | Bosch | H01S 3/0388 |
| | | | | 372/87 |
| 6,466,602 | B1 * | 10/2002 | Fleurov | H01S 3/036 |
| | | | | 372/87 |
| 6,810,061 | B2 * | 10/2004 | Hori | H01S 3/038 |
| | | | | 372/87 |
| 6,914,919 | B2 * | 7/2005 | Watson | H01S 3/038 |
| | | | | 372/55 |
| 7,068,697 | B1 * | 6/2006 | Amada | H01S 3/097 |
| | | | | 372/55 |
| 2001/0050937 | A1 | 12/2001 | Hori et al. | |
| 2002/0122453 | A1 * | 9/2002 | Morton | G03F 7/70933 |
| | | | | 372/59 |
| 2003/0031225 | A1 * | 2/2003 | Mizoguchi | H01S 3/225 |
| | | | | 372/55 |
| 2003/0042436 | A1 | 3/2003 | Hori et al. | |
| 2016/0308324 | A1 | 10/2016 | Ikeda et al. | |
| 2017/0093112 | A1 | 3/2017 | Luo et al. | |
| 2021/0066880 | A1 * | 3/2021 | Luo | H01S 3/032 |

FOREIGN PATENT DOCUMENTS

| | | |
|---|---|---|
| JP | 2001-332786 A | 11/2001 |
| JP | 2003-152249 A | 5/2003 |
| JP | 2004-179272 A | 6/2004 |
| JP | 2004-179599 A | 6/2004 |
| JP | 2007-103628 A | 4/2007 |
| WO | 2015-125631 A1 | 8/2015 |

OTHER PUBLICATIONS

International Preliminary Report On Patentability and Written Opinion issued in PCT/JP2020/048102; issued Jun. 13, 2023.

* cited by examiner

DISCHARGE ELECTRODE, METHOD FOR MANUFACTURING ANODE, AND METHOD FOR MANUFACTURING ELECTRONIC DEVICES

CROSS-REFERENCE TO RELATED APPLICATIONS

The present application is a continuation application of International Application No. PCT/JP2020/048102, filed on Dec. 23, 2020, the entire contents of which are hereby incorporated by reference.

BACKGROUND

1. Technical Field

The present disclosure relates to discharge electrodes, a method for manufacturing an anode, and a method for manufacturing electronic devices.

2. Related Art

In recent years, a semiconductor exposure apparatus is required to improve the resolution thereof as semiconductor integrated circuits are increasingly miniaturized and highly integrated. To this end, reduction in the wavelength of light emitted from a light source for exposure is underway. For example, a KrF excimer laser apparatus, which outputs laser light having a wavelength of about 248 nm, and an ArF excimer laser apparatus, which outputs laser light having a wavelength of about 193 nm, are used as a gas laser apparatus for exposure.

Light from spontaneously oscillating KrF and ArF excimer laser apparatuses has a wide spectral linewidth ranging from 350 to 400 pm. A projection lens made of a material that transmits ultraviolet light, such as KrF and ArF laser light, therefore produces chromatic aberrations in some cases. As a result, the resolution of the projection lens may decrease. To avoid the decrease in the resolution, the spectral linewidth of the laser light output from the gas laser apparatus needs to be narrow enough to make the chromatic aberrations negligible. To this end, a line narrowing module (LNM) including a line narrowing element (such as etalon and grating) is provided in some cases in a laser resonator of the gas laser apparatus to narrow the spectral linewidth. A gas laser apparatus providing a narrowed spectral linewidth is hereinafter referred to as a narrowed-line gas laser apparatus.

CITATION LIST

Patent Literature

[PTL 1] JP2004-179599A
[PTL 2] JP2007-103628A

SUMMARY

Discharge electrodes according to a viewpoint of the present disclosure are discharge electrodes used in a gas laser apparatus in which a fluorine-containing laser gas is excited by discharge, and include a cathode and an anode. The anode is disposed so as to face the cathode in a discharge direction perpendicular to a longitudinal direction of the cathode, and includes an electrode base containing metal, and a coating layer that covers a portion of a surface of the electrode base and contains an insulating material. First corners in a cross section perpendicular to the longitudinal direction connect first straight sections formed of first side surfaces that are side surfaces of the electrode base to a first curved section formed of a first discharge surface that is a discharge surface of the electrode base. The first corners are closer to the cathode in the discharge direction than second corners in the cross section. The second corners connect second straight sections formed of second side surfaces that are side surfaces of the coating layer to a second curved section formed of a second discharge surface that is a discharge surface of the coating layer.

An anode manufacturing method according to another viewpoint of the present disclosure is a method for manufacturing an anode that is a discharge electrode used in a gas laser apparatus in which a fluorine-containing laser gas is excited by discharge, the method including a first step of forming a coating layer at first side surfaces and a first discharge surface out of surfaces of an electrode base that constitutes the anode, the first discharging surface facing a cathode of the discharge electrodes, and a second step of partially removing the coating layer in such a way that a shape of the coating layer approaches a target shape. The second step includes partially removing the coating layer in such a way that first corners in a cross section perpendicular to a longitudinal direction of the cathode are closer to a position where the cathode is disposed in a discharge direction of discharge between the anode and the cathode than second corners in the cross section. The first corners connect first straight sections formed of the first side surfaces to a first curved section formed of the first discharge surface. The second corners connect second straight sections formed of second side surfaces that are side surfaces of the coating layer to a second curved section formed of a second discharge surface that is a discharge surface of the coating layer.

A method for manufacturing electronic devices according to another viewpoint of the present disclosure includes generating laser light by using a gas laser apparatus including a laser chamber including discharge electrodes, outputting the laser light to an exposure apparatus, and exposing a photosensitive substrate to the laser light in the exposure apparatus to manufacture the electronic devices. The discharge electrodes are used in the gas laser apparatus, in which a fluorine-containing laser gas is excited by discharge, and include a cathode and an anode. The anode is disposed so as to face the cathode in a discharge direction perpendicular to a longitudinal direction of the cathode, and includes an electrode base containing metal, and a coating layer that covers a portion of a surface of the electrode base and contains an insulating material. First corners in a cross section perpendicular to the longitudinal direction connect first straight sections formed of first side surfaces that are side surfaces of the electrode base to a first curved section formed of a first discharge surface that is a discharge surface of the electrode base. The first corners are closer to the cathode in the discharge direction than second corners in the cross section. The second corners connect second straight sections formed of second side surfaces that are side surfaces of the coating layer to a second curved section formed of a second discharge surface that is a discharge surface of the coating layer.

BRIEF DESCRIPTION OF THE DRAWINGS

Embodiments of the present disclosure will be described below only by way of example with reference to the accompanying drawings.

FIG. 3 is a perspective view of a cathode and an anode shown in FIGS. 1 and 2.

DETAILED DESCRIPTION

Figure 1:
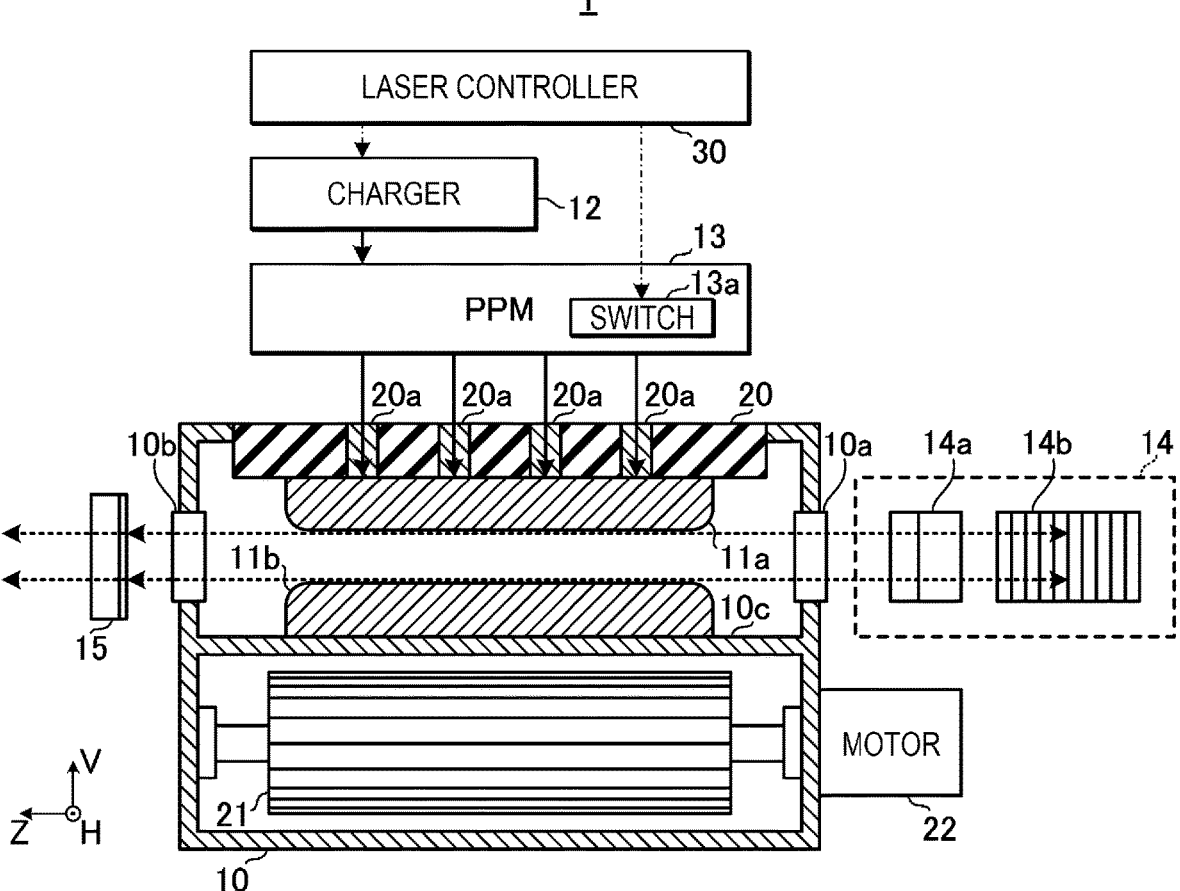
FIG. 1 diagrammatically shows the configuration of a gas laser apparatus according to Comparative Example.

<Contents>
1. Comparative Example
1.1 Configuration of gas laser apparatus 1
1.2 Operation
1.3 Problems with Comparative Example
2. Anode 11*b* with coating layer 112 having improved shape
2.1 Configuration
2.2 Operation
2.3 Effects
3. Anode 11*b* with coating layer 112 having varying thickness
3.1 Configuration
3.2 Effects
4. Method for manufacturing anode 11*b*
4.1 Manufacturing Steps
4.2 Effects
5. Others Embodiments of the present disclosure will be described below in detail with reference to the drawings. The embodiments described below show some examples of the present disclosure and are not intended to limit the contents of the present disclosure. Further, all configurations and operations described in the embodiments are not necessarily essential as configurations and operations in the present disclosure. The same component has the same reference character, and no redundant description of the same component will be made.

1. Comparative Example 1.1 Configuration of Gas Laser Apparatus 1

FIG. 1 diagrammatically shows the configuration of a gas laser apparatus 1 according to Comparative Example. The gas laser apparatus 1 shown in FIG. 1 includes a laser chamber 10, a cathode 11*a* and an anode 11*b*, which constitute a pair of discharge electrodes, a charger 12, a pulse power module (PPM) 13, a line narrowing module 14, an output coupling mirror 15, and a laser controller 30. The line narrowing module 14 and the output coupling mirror 15 constitute an optical resonator. The laser chamber 10 is disposed in the optical path of the optical resonator. FIG. 1 shows the internal configuration of the laser chamber 10 viewed in a direction approximately perpendicular to a direction of the discharge between the cathode 11*a* and the anode 11*b* and approximately perpendicular to a traveling direction of laser light output via the output coupling mirror 15.

Figure 2:
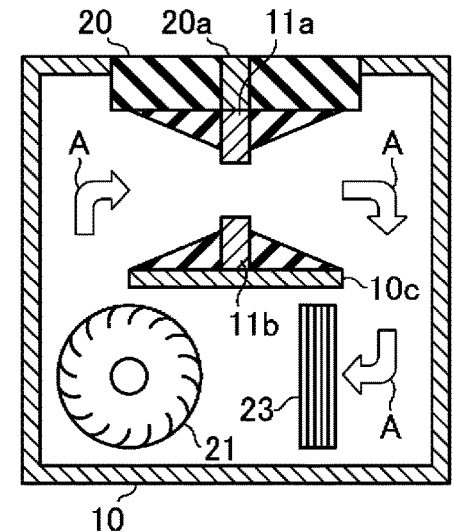
FIG. 2 diagrammatically shows the configuration of a laser chamber shown in FIG. 1 and the interior thereof.

FIG. 2 diagrammatically shows the configuration of the laser chamber 10 shown in FIG. 1 and the interior thereof. FIG. 2 shows the internal configuration of the laser chamber 10 viewed in a direction approximately parallel to the traveling direction of the laser light output via the output coupling mirror 15.

The traveling direction of the laser light output via the output coupling mirror 15 is called a direction +Z. The direction of the discharge between the cathode 11*a* and the anode 11*b* is called a direction +V or a direction −V. The directions +Z and +V are perpendicular to each other. The direction perpendicular to both of the directions +Z and +V is called a direction +H or a direction −H. The direction −V approximately coincides with the direction of gravity.

The laser chamber 10 houses the cathode 11*a*, the anode 11*b*, a crossflow fan 21, and a heat exchanger 23.

An opening is formed at a portion of the laser chamber 10, and the opening is closed by an electric insulator 20. The electric insulator 20 supports the cathode 11*a*. A plurality of conductors 20*a* are buried in the electric insulator 20. The conductors 20*a* are each electrically connected to the cathode 11*a*.

A return plate 10*c* is disposed in the laser chamber 10. The anode 11*b* is supported by the return plate 10*c*. The anode 11*b* is electrically connected to ground potential via the return plate 10*c* and a conductive member of the laser chamber 10.

There are gaps located between the laser chamber 10 and the return plate 10*c*, a gap on the far side and a gap on the near side of the plane of view of FIG. 1, and the laser gas passes through the gaps, as shown in FIG. 2.

The rotary shaft of the crossflow fan 21 is connected to a motor 22 disposed outside the laser chamber 10. The motor 22 rotates the crossflow fan 21. The laser gas thus circulates in the laser chamber 10, as indicated by arrows A in FIG. 2. The heat exchanger 23 exhausts thermal energy of the laser gas having become hot due to the discharge to the space outside the laser chamber 10.

The laser chamber 10 is filled with a laser gas containing, for example, an argon or krypton gas as a rare gas, a fluorine gas as a halogen gas, and a neon gas as a buffer gas. Windows 10*a* and 10*b* are provided at opposite ends of the laser chamber 10.

The charger 12 retains electric energy to be supplied to the pulse power module 13. The pulse power module 13 includes a charging capacitor that is not shown and a switch 13*a*. The charging capacitor of the pulse power module 13 is connected to the charger 12. The cathode 11*a* is connected to the charging capacitor of the pulse power module 13 via the conductors 20*a*.

Figure 3:
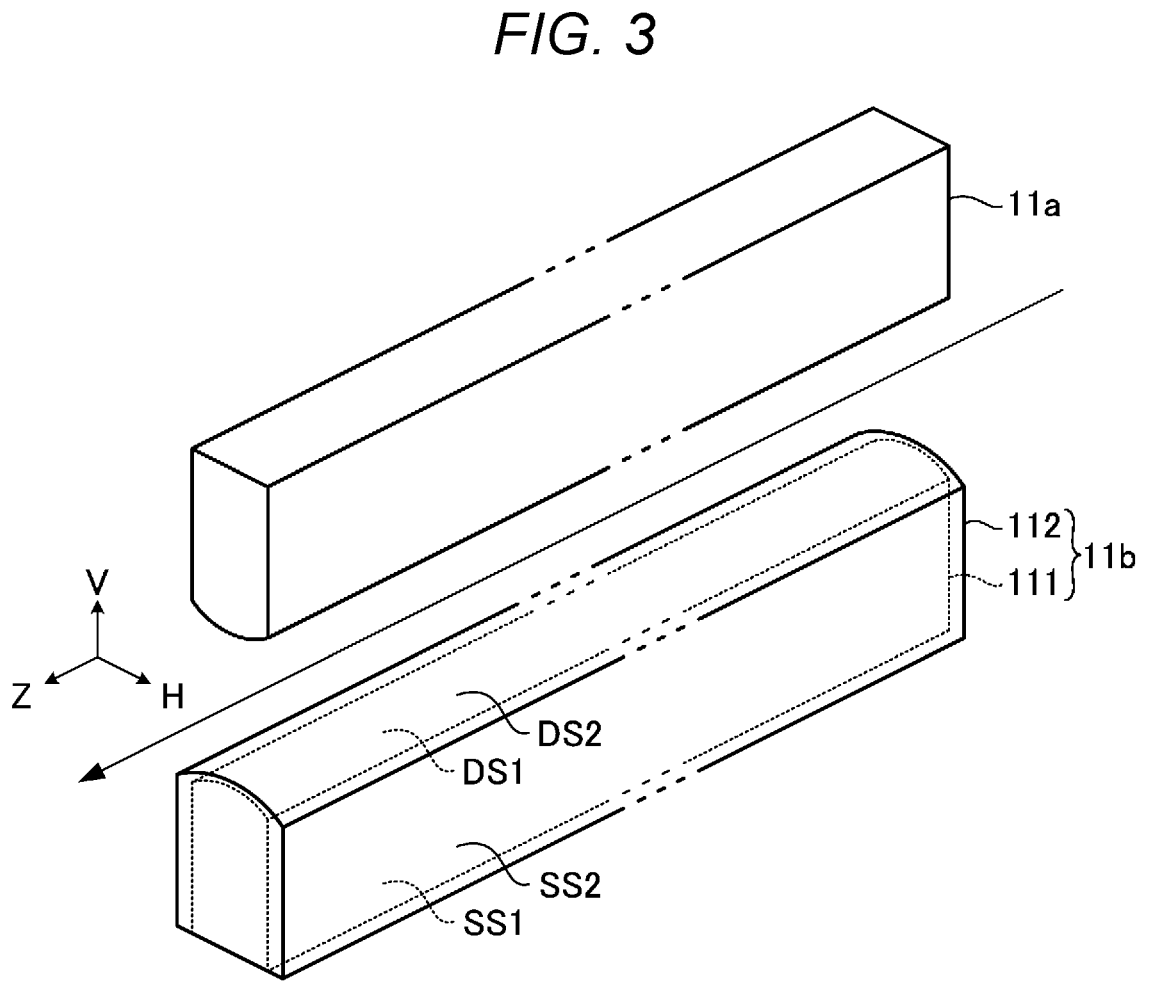

FIG. 3 is a perspective view of the cathode 11*a* and the anode 11*b* shown in FIGS. 1 and 2. The cathode 11*a* and the anode 11*b* each have a longitudinal direction approximately parallel to the Z-axis. The anode 11*b* is disposed at a position shifted from the cathode 11*a* in the direction −V so as to face the cathode 11*a*. In FIG. 3, the cathode 11*a* and the anode 11*b* are each so shown that the longitudinal opposite ends and the vicinity thereof are shown but a central portion thereof is omitted.

The anode 11*b* includes an electrode base 111, which contains metal, and a coating layer 112, which covers a portion of the surface of the electrode base 111 and contains an insulating material. The side surfaces of the electrode base 111 are called first side surfaces SS1. The discharge surface of the electrode base 111 facing the cathode 11*a* is called a first discharge surface DS1. The side surfaces of the coating layer 112 are called second side surfaces SS2. The discharge surface of the coating layer 112 facing the cathode 11*a* is called a second discharge surface DS2.

It is assumed in the present disclosure that the discharge surface of one of a pair of discharge electrodes is a surface facing the other discharge electrode. When the first discharge surface DS1 is covered with the coating layer 112, discharge does not necessarily occur at the first discharge surface DS1.

Referring back to FIG. 1, the line narrowing module 14 includes a prism 14*a* and a grating 14*b*. The line narrowing module 14 may be replaced with a highly reflective mirror.

The output coupling mirror 15 is made of a material that transmits light having a wavelength selected by the line narrowing module 14, and one surface of the output coupling mirror 15 is coated with a partially reflective film.

1.2 Operation

The laser controller 30 receives target pulse energy setting data and an emission trigger signal from an exposure apparatus that is not shown. The laser controller 30 transmits charging voltage setting data to the charger 12 based on the target pulse energy setting data. The laser controller 30 further transmits a trigger signal to the pulse power module 13 based on the emission trigger signal.

Upon receipt of the trigger signal from the laser controller 30, the pulse power module 13 generates a pulse-shaped high voltage from the electric energy charged in the charger 12 and applies the high voltage to the space between the cathode 11*a* and the anode 11*b*.

When the high voltage is applied to the space between the cathode 11*a* and the anode 11*b*, discharge occurs between the cathode 11*a* and the anode 11*b*. The energy of the discharge excites a laser medium in the laser chamber 10, and the excited laser medium transitions to a high energy level. Thereafter, when the excited laser medium transitions to a low energy level, the laser medium emits light having a wavelength according to the difference between the energy levels.

The light generated in the laser chamber 10 exits out of the laser chamber 10 via the windows 10*a* and 10*b*. The light having exited via the window 10*a* of the laser chamber 10 is enlarged in terms of the beam width in the H-axis direction by the prism 14*a* and is then incident on the grating 14*b*.

The light incident from the prism 14*a* on the grating 14*b* is reflected off and diffracted by a plurality of grooves of the grating 14*b* in the direction according to the wavelength of the light.

The prism 14*a* reduces the beam width, in the H-axis direction, of the diffracted light from the grating 14*b* and causes the light to return to the laser chamber 10 via the window 10*a*.

The output coupling mirror 15 transmits and outputs part of the light having exited via the window 10*b* of the laser chamber 10 and reflects the other part of the light back into the laser chamber 10.

The light having exited out of the laser chamber 10 thus travels back and forth between the line narrowing module 14 and the output coupling mirror 15 and is amplified whenever passing through the discharge space between the cathode 11*a* and the anode 11*b*. The light undergoes the line narrowing operation whenever deflected back by the line narrowing module 14. The light thus having undergone the laser oscillation and the line narrowing operation is output as the laser light via the output coupling mirror 15.

1.3 Problems with Comparative Example

Figure 4:
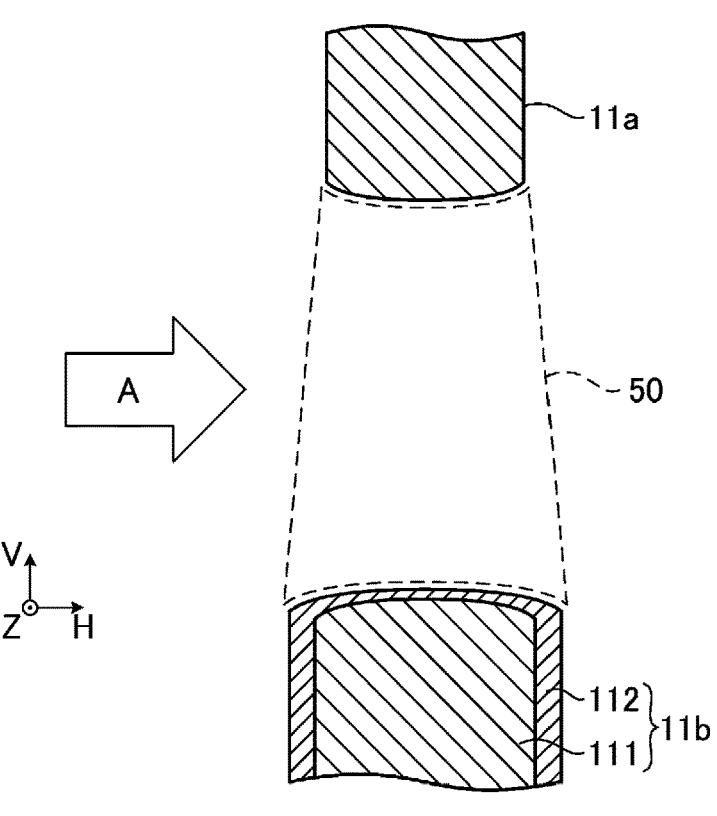
FIG. 4 diagrammatically shows the state of discharge between the cathode and the anode in Comparative Example.

FIG. 4 diagrammatically shows the state of the discharge between the cathode 11*a* and the anode 11*b* in Comparative Example. A discharge space 50 is formed between the cathode 11*a* and the anode 11*b*.

The coating layer 112 contains an insulating material to suppress degradation of the surface of the electrode base 111, and the resistivity of the material that forms the coating layer 112 is higher than that of the material that forms the electrode base 111. When the electrical resistance of the coating layer 112 is too high, however, the discharge is unlikely to occur. To prevent this, the coating layer 112 contains metal as well as the insulating material. When the high voltage is applied to the space between the cathode 11*a* and the anode 11*b*, the electric field tends to concentrate in the vicinity of the corners of the anode 11*b*. The discharge space 50 thus extends to the vicinity of the corners of the coating layer 112.

Figure 5:
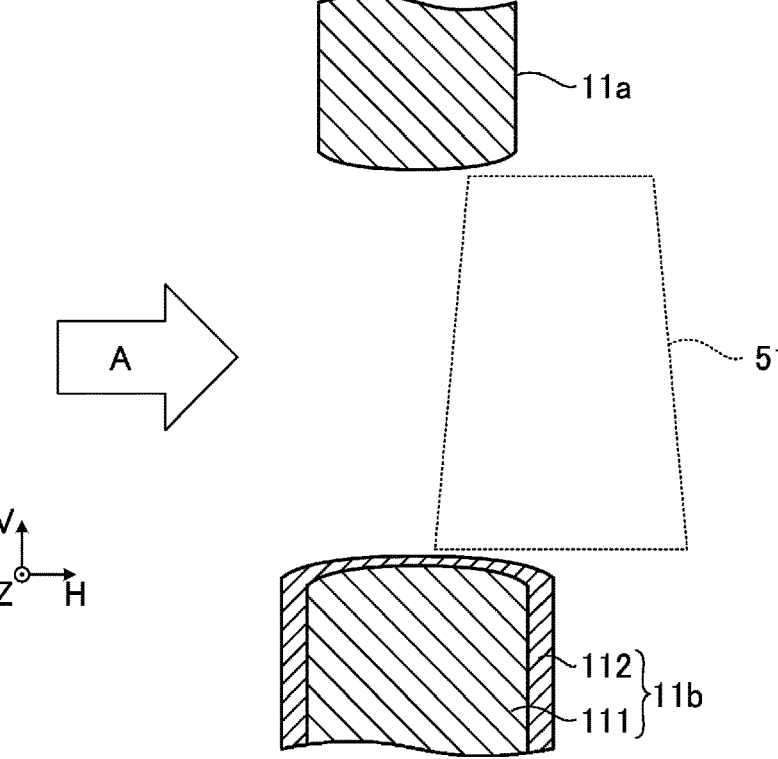
FIG. 5 diagrammatically shows the state after the discharge between the cathode and the anode shown in FIG. 4 takes place.

FIG. 5 diagrammatically shows the state after the discharge between the cathode 11*a* and the anode 11*b* shown in FIG. 4 takes place. Since the laser gas is circulated by the crossflow fan 21 (see FIG. 2) inside the laser chamber 10 in the direction indicated by the arrow A, discharge products 51, including ions or metal fine particles generated by the discharge, move in the direction +H when viewed from the discharge space 50 in FIG. 4.

Figure 6:
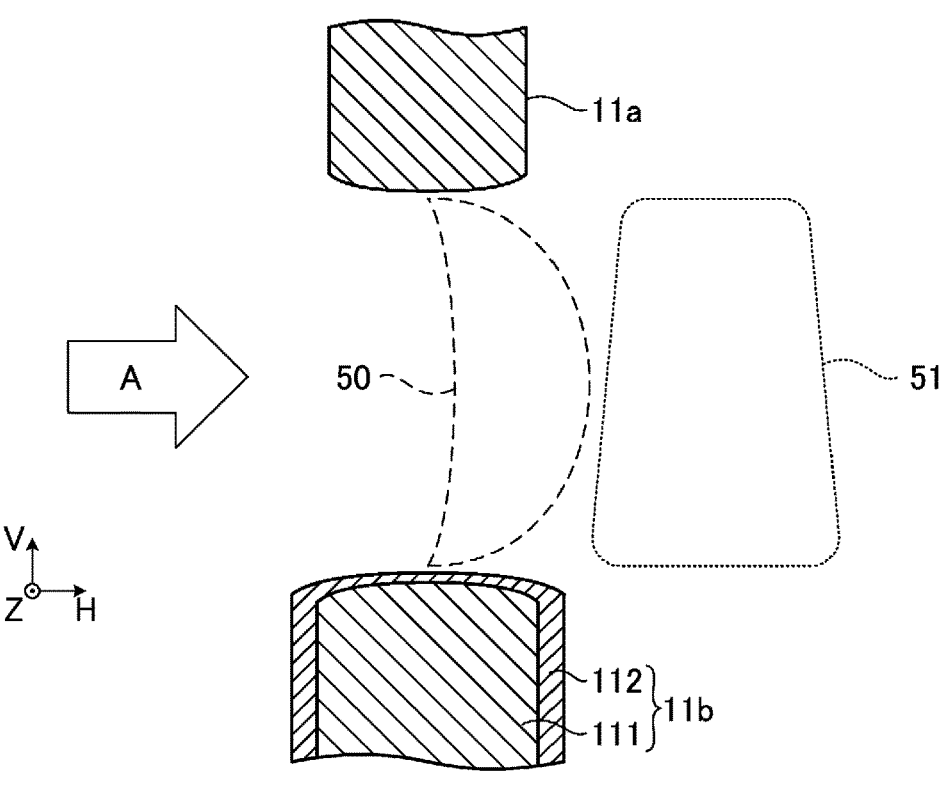
FIG. 6 diagrammatically shows the state of the discharge that follows the discharge between the cathode and the anode shown in FIG. 4.
Figure 7:
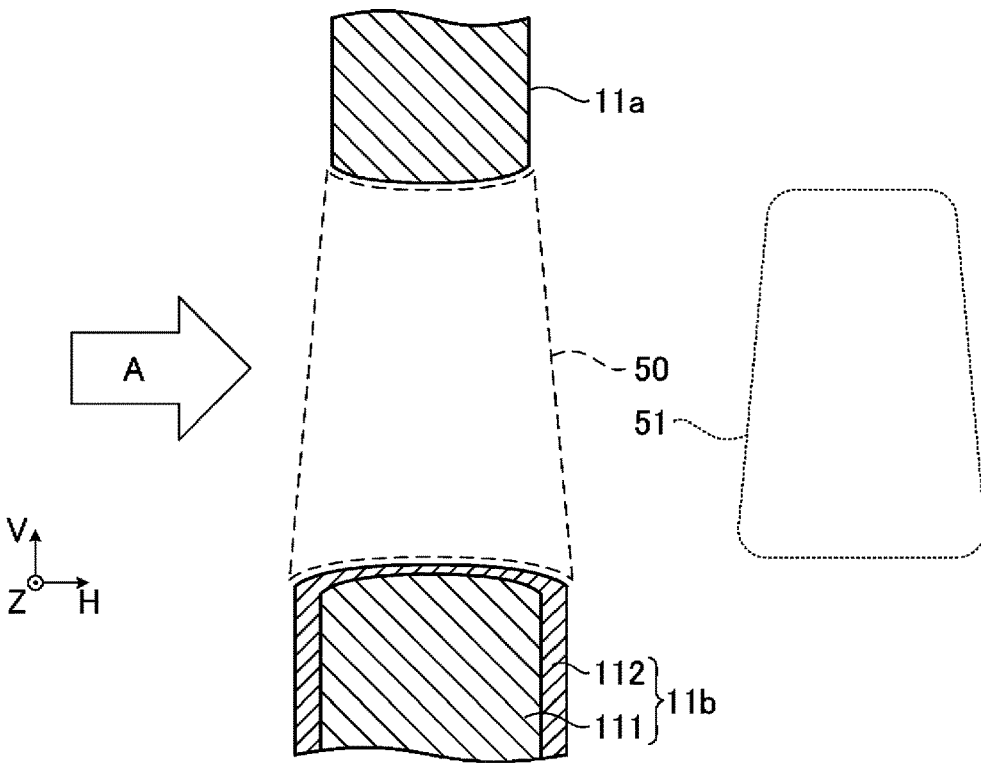
FIG. 7 diagrammatically shows the state of the discharge that follows the discharge between the cathode and the anode shown in FIG. 4.

FIGS. 6 and 7 diagrammatically show the state of the discharge that follows the discharge between the cathode 11*a* and the anode 11*b* shown in FIG. 4. In FIG. 6, the discharge products 51 are located in the vicinity of the cathode 11*a* and the anode 11*b*, whereas in FIG. 7, the discharge products 51 are located far from the cathode 11*a* and the anode 11*b*.

In FIG. 6, the flow of the electrons from the cathode 11*a* to the anode 11*b* that is produced by the discharge is attracted to the discharge products 51. The formed discharge space 50 in FIG. 6 is therefore offset in the direction +H, resulting in unstable discharge and hence unstable laser light generation.

On the other hand, when the discharge products 51 are located far from the cathode 11a and the anode 11b, as in FIG. 7, the discharge space 50 is not greatly affected by the discharge products 51 and is formed similarly to the discharge space 50 in FIG. 4.

To increase the distance from the cathode 11a and the anode 11b to the discharge products 51 without reduction in the repetition frequency of the laser light, the following method (1) or (2) is used.

(1) Increase the speed of the laser gas flow produced by the crossflow fan 21

(2) Reduce the width of the discharge space 50 in the H-axis direction

Increasing the speed of the laser gas flow, however, disadvantageously increases the electric power consumed to drive the motor 22. The consumed electric power is proportional to the cube of the speed of the laser gas flow.

To reduce the width of the discharge space 50 in the H-axis direction, it is still conceivable to reduce the width of each of the cathode 11a and the anode 11b, but reduction in the width of each of the electrodes results in an increase in electrical resistance of the electrode in some cases.

Some embodiments described below are so configured that first corners C1 of the electrode base 111 are closer to the cathode 11a than second corners C2 of the coating layer 112. The configuration described above does not cause the discharge space 50 to extend to the vicinity of the second corners C2 of the coating layer 112 but can reduce the width of the discharge space 50 in the H-axis direction.

2. Anode 11b with Coating Layer 112 Having Improved Shape

2.1 Configuration

Figure 8:
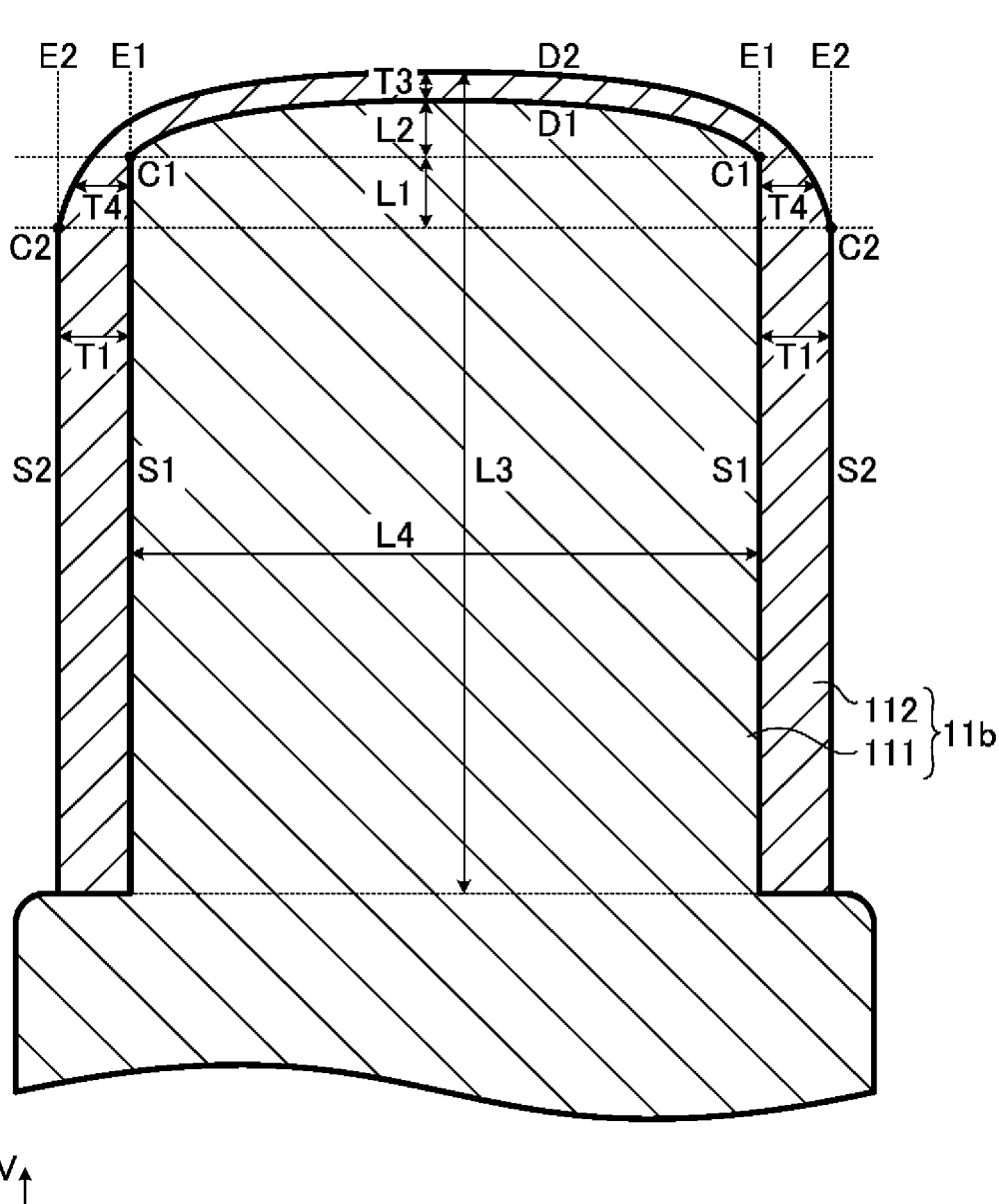
FIG. 8 is a cross-sectional view of the anode that constitutes a discharge electrode according to a first embodiment.

FIG. 8 is a cross-sectional view of the anode 11b that constitutes a discharge electrode according to a first embodiment. FIG. 8 shows a cross-section, perpendicular to the Z-axis, of the electrode base 111 and the coating layer 112, which constitute the anode 11b. The cathode 11a, which is not shown in FIG. 8, is shifted in the direction +V when viewed from the anode 11b. The cathode 11a is the same as that described with reference to FIG. 3.

The cross-section of the electrode base 111 has first straight sections S1 and a first curved section D1. The first straight sections S1 are the contours of the first side surfaces SS1 (see FIG. 3), which are the side surfaces of the electrode base 111. The first curved section D1 is formed of the contour of the first discharge surface DS1, which is the discharge surface of the electrode base 111. The first straight sections S1 are connected to the first curved section D1 via the first corners C1.

The cross section of the coating layer 112 has second straight sections S2 and a second curved section D2. The second straight sections S2 are the contours of the second side surfaces SS2, which are the side surfaces of the coating layer 112. The second curved section D2 is formed of the contour of the second discharge surface DS2, which is the discharge surface of the coating layer 112. The second straight sections S2 are connected to the second curved section D2 via the second corners C2.

The first corners C1 and the second corners C2 may be defined as follows. Let E1 be the straight line extending from each of the first straight sections S1 toward the cathode 11a, and the first corners C1 are each the point where the contour of the cross section of the electrode base 111 branches off the first straight section S1 into the first curved section D1 and the straight line E1. Let E2 be the straight line extending from each of the second straight sections S2 toward the cathode 11a, and the second corners C2 are each the point where the contour of the cross section of the coating layer 112 branches off the second straight section S2 into the second curved section D2 and the straight line E2.

FIG. 8 shows the case where the two first straight sections S1, which are formed of the two side surfaces of the electrode base 111, are parallel to each other, but not necessarily in the present disclosure. The first straight sections S1 may not be parallel to each other.

FIG. 8 shows the case where the two second straight sections S2, which are formed of the two side surfaces of the coating layer 112, are parallel to each other, but not necessarily in the present disclosure. The second straight sections S2 may not be parallel to each other.

In the first embodiment, the coating layer 112 is so formed that the first corners C1 are closer to the cathode 11a in the V-axis direction than the second corners C2.

The first curved section D1 and the second curved section D2 are each a curve convex toward the cathode 11a. That is, the first discharge surface DS1 and the second discharge surface DS2 are each a curved surface convex toward the cathode 11a, as shown in FIG. 3.

Let L1 be the distance in the V-axis direction between the first corners C1 and the second corners C2. Let L2 be the maximum of the distance in the V-axis direction from the first corners C1 to the first curved section D1. The maximum L2 corresponds to the distance in the V-axis direction from the first corners C1 to the portion of the first curved section D1 protruding toward the cathode 11a by the largest amount. The distance L1 is desirably greater than or equal to the maximum L2. The distance L1 is desirably greater than or equal to 0.2 mm.

Let L3 be the length of the coating layer 112 in the V-axis direction. The length L3 corresponds to the distance in the V-axis direction from the end of the coating layer 112 facing in the direction −V to the portion of the second curved section D2 protruding toward the cathode 11a by the largest amount. Let L4 be the width of the electrode base 111 in the H-axis direction. The length L3 is desirably greater than or equal to the width L4. The length L3 is desirably greater than or equal to 4 mm.

The portions of the coating layer 112, that cover the first side surfaces SS1, each have a first thickness T1 at positions that are farther from the cathode 11a than the second corners C2 are but become thinner from the second corners C2 toward the cathode 11a. Therefore, a fourth thickness T4 of the coating layer 112 at the positions at the side of the second corners C2 closer to the cathode 11a but at the side of the first corners C1 farther from the cathode 11a is smaller than the first thickness T1.

The portion of the coating layer 112 that covers the first discharge surface DS1 has a third thickness T3. The first thickness T1 is desirably greater than or equal to the third thickness T3 but smaller than or equal to three times the third thickness T3. The first thickness T1 is further desirably greater than or equal to the third thickness T3 but smaller than or equal to twice the third thickness T3. The first thickness T1 is desirably greater than or equal to 0.1 mm but smaller than or equal to 0.3 mm. The first thickness T1 is further desirably greater than or equal to 0.1 mm but smaller than or equal to 0.2 mm.

The electrode base 111 contains metal. The metal contained in the electrode base 111 is, for example, copper. The coating layer 112 contains an insulating material and metal. The insulating material contained in the coating layer 112 is, for example, alumina, and the metal contained therein is, for example, copper.

The laser chamber 10 according to the first embodiment includes the discharge electrodes according to the first embodiment. Except for the anode 11*b*, which is one of the discharge electrodes, the laser chamber 10 is the same as that described with reference to FIGS. 1 and 2.

The gas laser apparatus 1 according to the first embodiment includes the laser chamber 10 according to the first embodiment. Except for the anode 11*b*, the gas laser apparatus 1 is the same as that described with reference to FIGS. 1 and 2.

2.2 Operation

Figure 9:
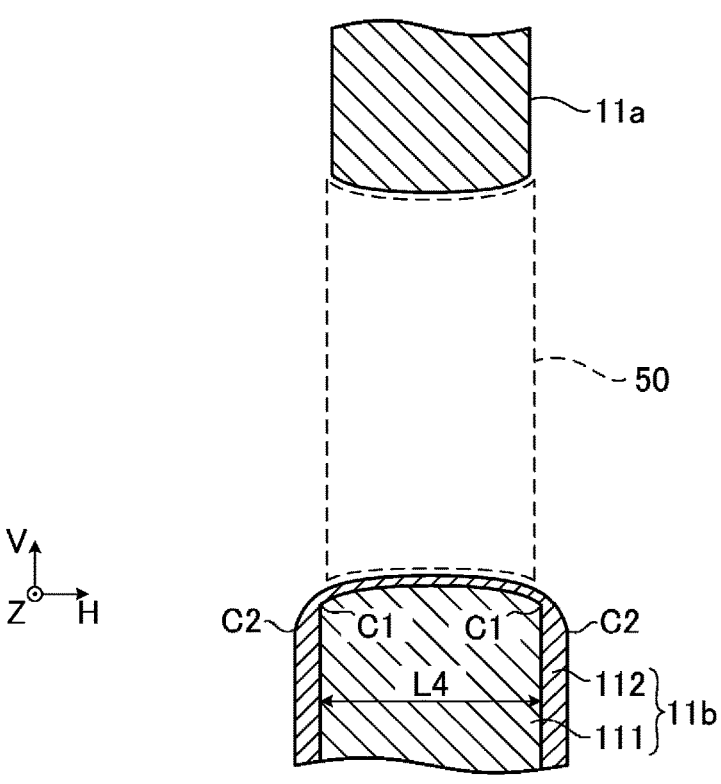
FIG. 9 diagrammatically shows the state of the discharge between the cathode and the anode in the first embodiment.

FIG. 9 diagrammatically shows the state of the discharge between the cathode 11*a* and the anode 11*b* in the first embodiment. In the first embodiment, the coating layer 112 is so formed that the first corners C1 of the electrode base 111 are closer to the cathode 11*a* than the second corners C2 of the coating layer 112. The configuration described above suppresses concentration of the electric field in the vicinity of the second corners C2, so that the width of the discharge space 50 decreases and approaches the width L4 of the electrode base 111. The distance from the cathode 11*a* and the anode 11*b* to the discharge products 51 (see FIGS. 6 and 7) thus increases at the time of the following discharge. Therefore, the discharge space 50 is formed without greatly affected by the discharge products 51, whereby the discharge is stabilized.

2.3 Effects (1) The discharge electrodes according to the first embodiment are discharge electrodes used in the gas laser apparatus 1, in which the fluorine-containing laser gas is excited by the discharge, and include the cathode 11*a* and the anode 11*b*. The anode 11*b* is disposed so as to face the cathode 11*a* in the V-axis direction. The anode 11*b* includes the electrode base 111, which contains metal, and the coating layer 112, which covers a portion of the surface of the electrode base 111 and contains an insulating material. The first corners C1 of the anode 11*b* in a cross-section perpendicular to the Z-axis are closer to the cathode 11*a* in the V-axis direction than the second corners C2.

The configuration described above can suppress concentration of the electric field in the vicinity of the second corners C2, and therefore reduce the width of the discharge space 50. The discharge is thus stabilized.

(2) In the first embodiment, the first discharge surface DS1 and the second discharge surface DS2 are each a curved surface convex toward the cathode 11*a*.

The configuration described above allows the energy of the discharge to concentrate in the vicinity of the center of the width of the anode 11*b* in the H-axis direction, whereby the width of the discharge space 50 can be reduced.

(3) In the first embodiment, the distance L1 in the V-axis direction between the first corners C1 and the second corners C2 is greater than or equal to the maximum L2 of the distance in the V-axis direction from the first corners C1 to the first curved section D1.

The configuration described above can suppress concentration of the electric field in the vicinity of the second corners C2, and therefore reduce the width of the discharge space 50.

(4) In the first embodiment, the distance L1 in the V-axis direction between the first corners C1 and the second corners C2 is greater than or equal to 0.2 mm.

The configuration described above can suppress concentration of the electric field in the vicinity of the second corners C2, and therefore reduce the width of the discharge space 50.

(5) In the first embodiment, the coating layer 112 contains an insulating material and metal.

The configuration described above allows both the stability of the discharge between the cathode 11*a* and the anode 11*b* and the suppression of the degradation of the anode 11*b*.

(6) In the first embodiment, the length L3 of the coating layer 112 in the V-axis direction is greater than or equal to the width L4 of the electrode base 111 in the H-axis direction.

The configuration described above allows the electrode life to be prolonged as compared with a case where the length L3 of the coating layer 112 in the V-axis direction is shorter than the width L4.

(7) In the first embodiment, the length L3 of the coating layer 112 in the V-axis direction is greater than or equal to 4 mm.

The configuration described above allows the electrode life to be prolonged as compared with the case where the length L3 of the coating layer 112 in the V-axis direction is shorter than 4 mm.

(8) In the first embodiment, the portions of the coating layer 112 that cover the first side surfaces SS1 each have the first thickness T1 at the positions that are farther from the cathode 11*a* than the second corners C2 are but become thinner from the second corners C2 toward the cathode 11*a*.

The configuration described above allows the thickness of the coating layer 112 to undergo gradual positional change in the vicinity of the second discharge surface DS2. Unevenness of the degradation of the coating layer 112 is thus reduced, whereby the electrode life can be prolonged.

(9) In the first embodiment, the portions of the coating layer 112 that cover the first side surfaces SS1 each have the first thickness T1 greater than or equal to the third thickness T3 of the portion of the coating layer 112 that covers the first discharge surface DS1 but smaller than or equal to three times or twice the third thickness T3.

Setting the first thickness T1 greater than or equal to the third thickness T3 allows both the stability of the discharge between the cathode 11*a* and the anode 11*b* via the second discharge surface DS2 and the suppression of the degradation of the first side surfaces SS1. Setting the first thickness T1 smaller than or equal to three times or twice the third thickness T3 allows suppression of a decrease in the speed of the laser gas flow.

In the first embodiment, the portions of the coating layer 112 that cover the first side surfaces SS1 each have the first thickness T1 greater than or equal to 0.1 mm but smaller than or equal to 0.3 mm or 0.2 mm.

Setting the first thickness T1 greater than or equal to 0.1 mm allows the suppression of the degradation of the first side surfaces SS1. Setting the first thickness T1 smaller than or equal to 0.3 mm or 0.2 mm allows the suppression of a decrease in the speed of the laser gas flow.

As for the other points, the first embodiment is the same as Comparative Example.

Figure 10:
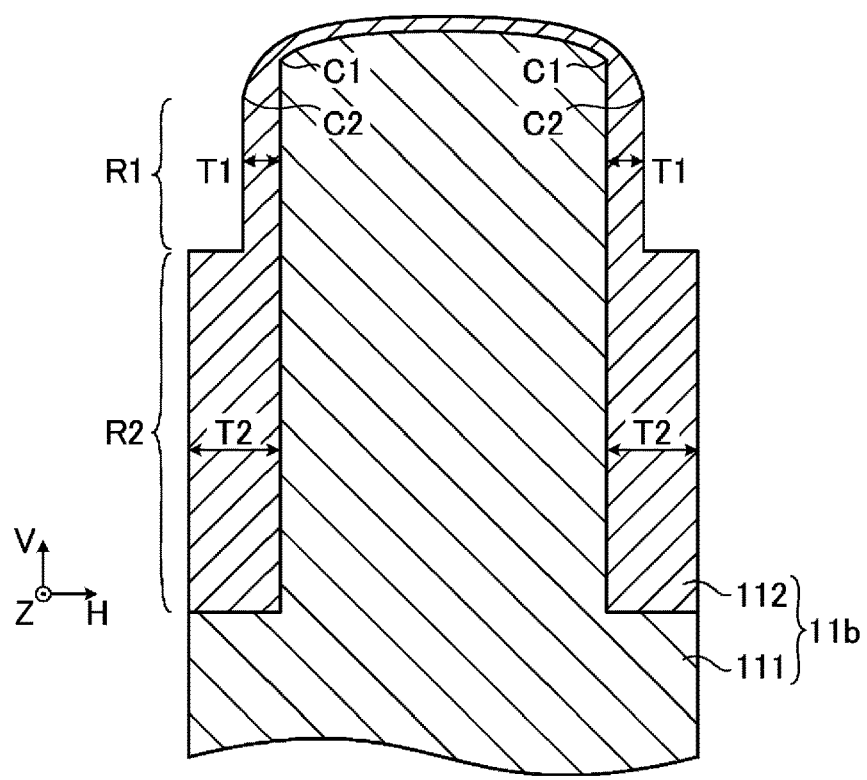
FIG. 10 is a cross-sectional view of the anode that constitutes a discharge electrode according to a second embodiment.

3. Anode 11*b* with Coating Layer 112 Having Varying Thickness 3.1 Configuration FIG. 10 is a cross-sectional view of the anode 11*b* that constitutes a discharge electrode according to a second embodiment. FIG. 10 shows a cross-section, perpendicular to the Z-axis, of the electrode base 111 and the coating layer 112, which constitute the anode 11b. The cathode 11a, which is not shown in FIG. 10, is shifted in the direction +V when viewed from the anode 11b.

In the second embodiment, the portions of the coating layer 112 that cover the first side surfaces SS1 (FIG. 3) each have a first region R1 having the first thickness T1 and a second region R2 having a second thickness T2 greater than the first thickness T1. The first region R1 is a region farther from the cathode 11a than the second corners C2, and the second region R2 is a region farther from the cathode 11a than the first region R1.

The thickness of the coating layer 112 may change stepwise between the first region R1 and the second region R2.

Figure 11:
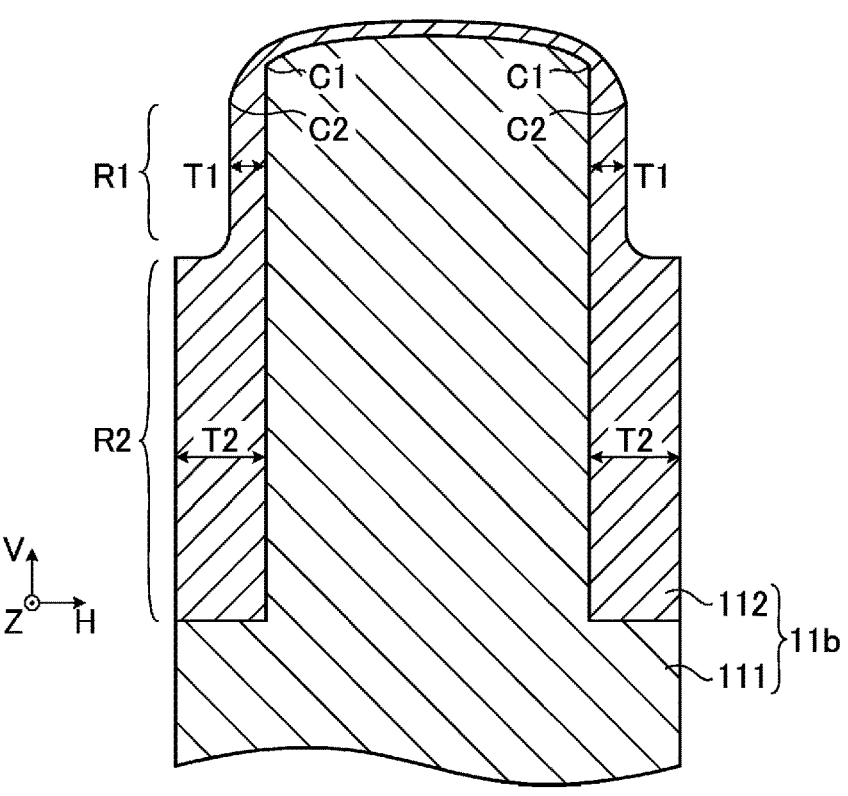
FIG. 11 is a cross-sectional view of the anode that constitutes a discharge electrode according to a first variation of the second embodiment.
Figure 12:
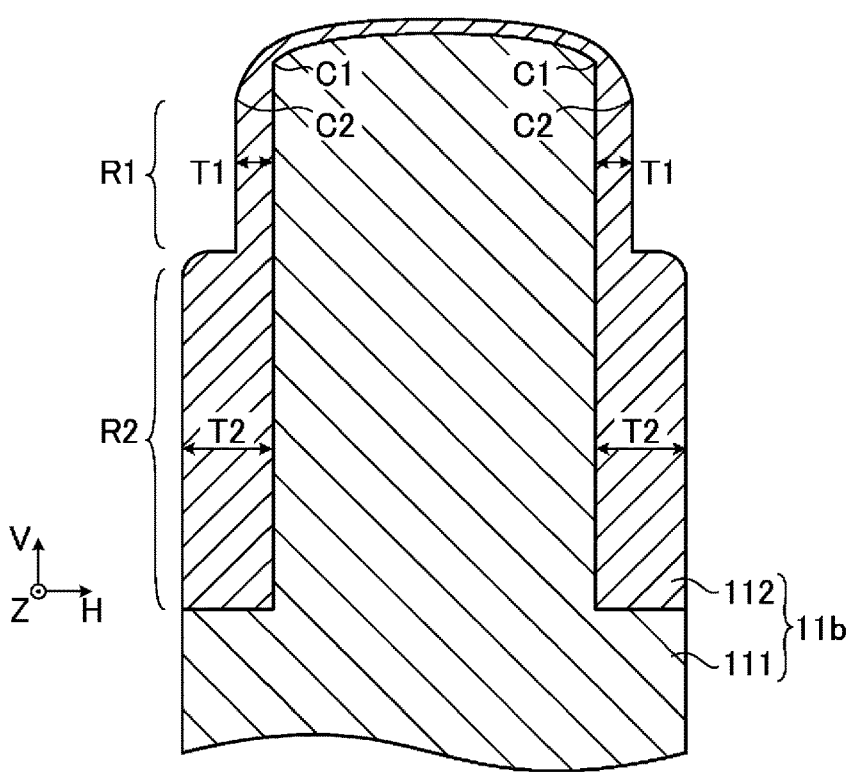
FIG. 12 is a cross-sectional view of the anode that constitutes a discharge electrode according to a second variation of the second embodiment.

FIG. 11 is a cross-sectional view of the anode 11b that constitutes a discharge electrode according to a first variation of the second embodiment. FIG. 12 is a cross-sectional view of the anode 11b that constitutes a discharge electrode according to a second variation of the second embodiment.

The thickness of the coating layer 112 may change stepwise between the first region R1 and the second region R2, and the surface of the coating layer 112 may be rounded between the first region R1 and the second region R2.

Figure 13:
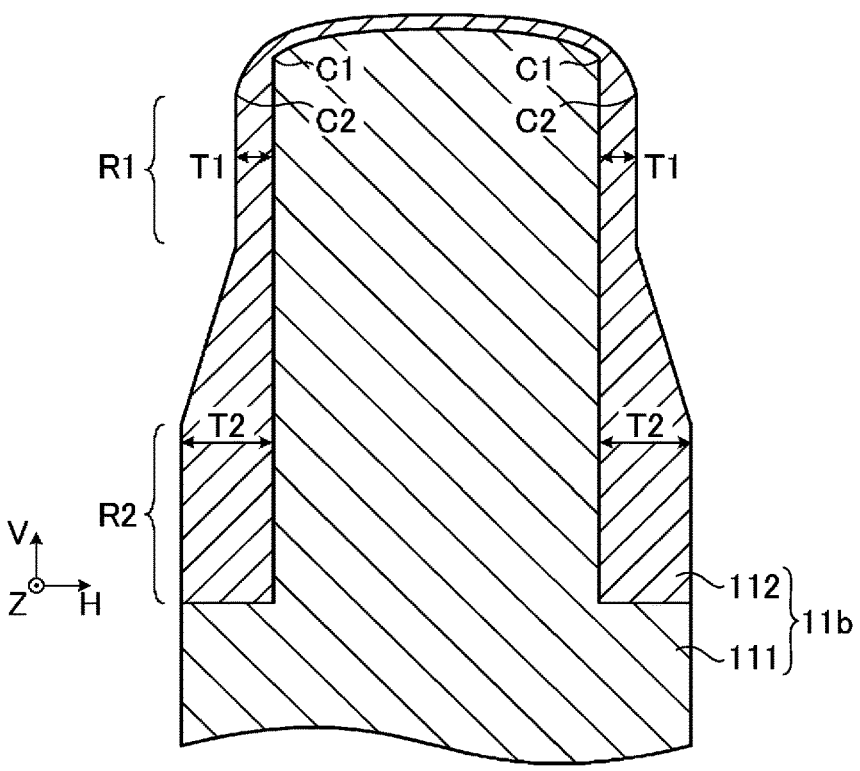
FIG. 13 is a cross-sectional view of the anode that constitutes a discharge electrode according to a third variation of the second embodiment.
Figure 14:
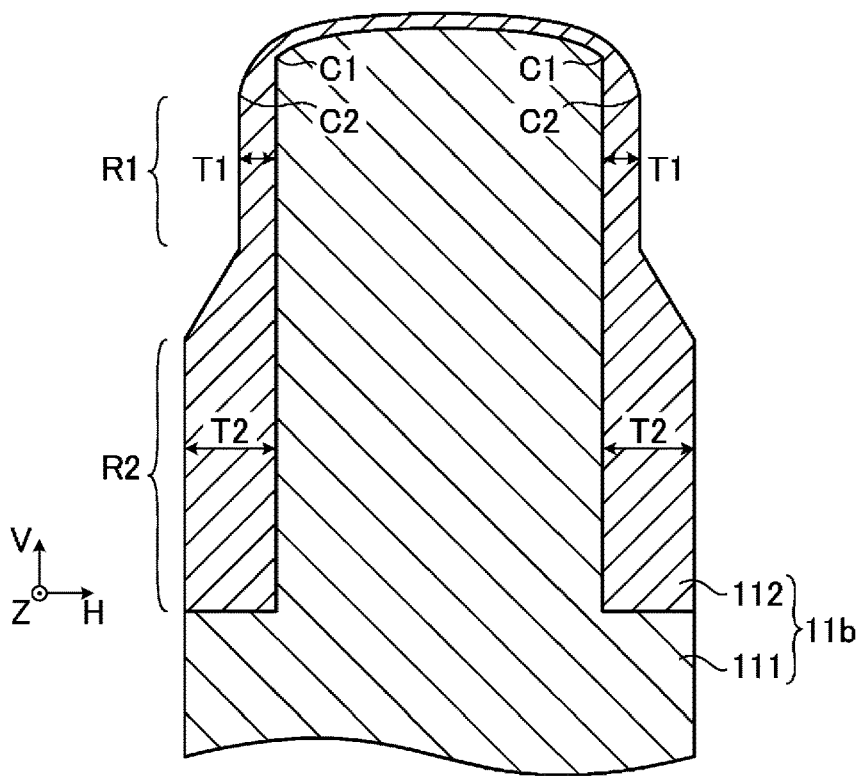
FIG. 14 is a cross-sectional view of the anode that constitutes a discharge electrode according to a fourth variation of the second embodiment.

FIG. 13 is a cross-sectional view of the anode 11b that constitutes a discharge electrode according to a third variation of the second embodiment. FIG. 14 is a cross-sectional view of the anode 11b that constitutes a discharge electrode according to a fourth variation of the second embodiment.

The thickness of the coating layer 112 may change in such a way that the coating layer 112 is tapered between the first region R1 and the second region R2.

3.2 Effects

According to the second embodiment and the variations thereof, the portions of the coating layer 112 that cover the first side surfaces SS1 each have the first region R1 having the first thickness T1 at the positions at the side of the second corners C2 farther from the cathode 11a and the second region R2 having the second thickness T2 greater than the first thickness T1 at the positions at the side of the first region R1 farther from the cathode 11a.

The first region R1 requires high processing accuracy, whereas the second region R2 does not require as high processing accuracy as the first region R1 because the second region R2 is far from the cathode 11a. According to the second embodiment and the variations thereof, the region that requires high processing accuracy can be limited to a smaller region than in a case where the entire region of the coating layer 112 that is farther from the cathode 11a than the second corners C2 has the first thickness T1. In addition, when a portion of the coating layer 112a is ground or polished to the first thickness T1 after the coating layer 112a is formed, as will be described in a third embodiment, the region that requires the grinding or polishing can be limited.

As for the other points, the second embodiment and the variations thereof are the same as the first embodiment.

4. Method for Manufacturing Anode 11b

4.1 Manufacturing Steps

Figure 15:
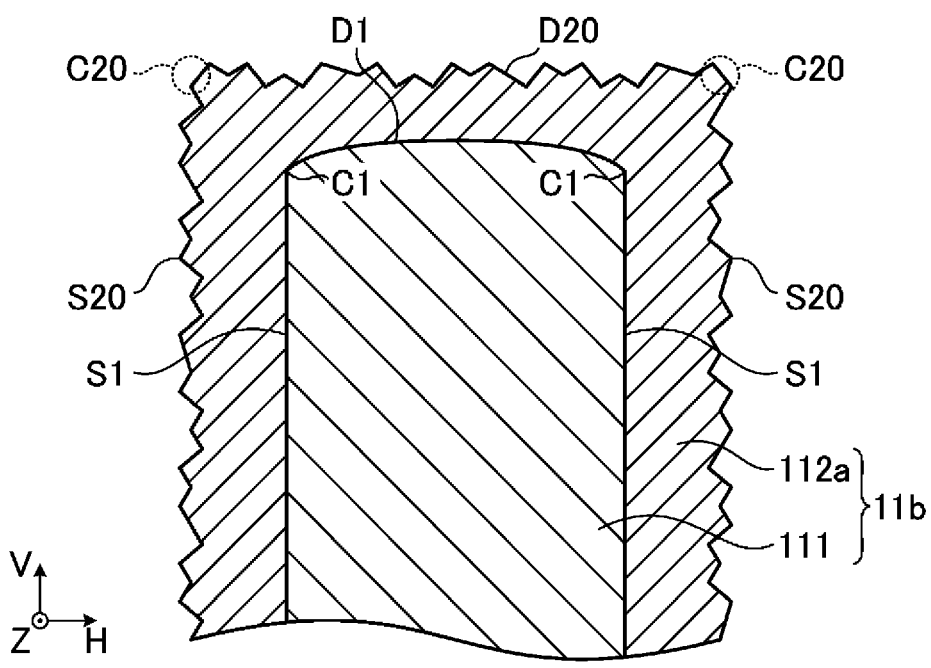
FIG. 15 is a cross-sectional view showing the step of manufacturing the anode that constitutes a discharge electrode according to a third embodiment.
Figure 16:
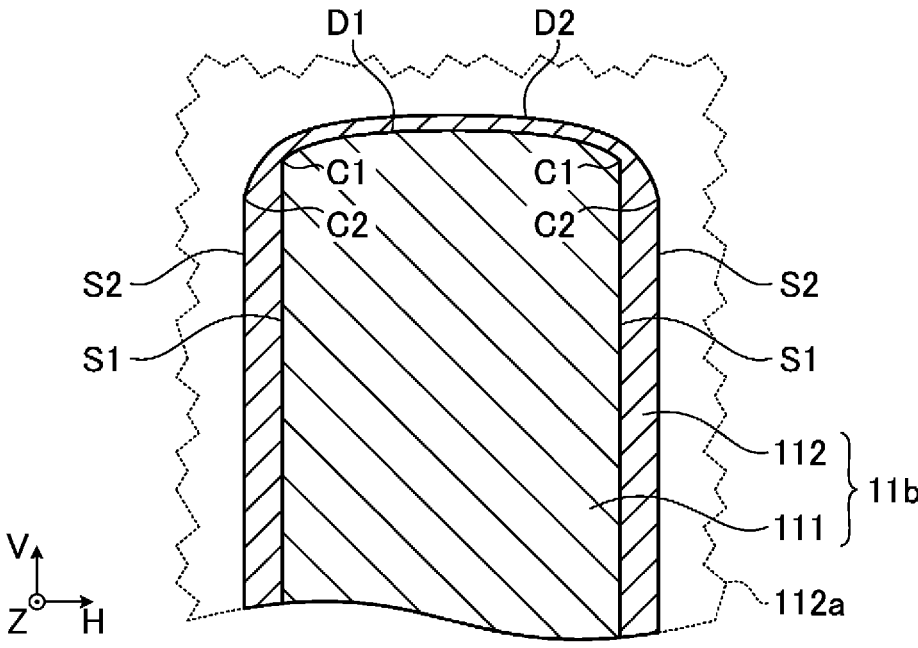
FIG. 16 is a cross-sectional view showing the step of manufacturing the anode that constitutes a discharge electrode according to the third embodiment.

FIGS. 15 and 16 are cross-sectional views showing the steps of manufacturing the anode 11b that constitutes a discharge electrode according to the third embodiment. FIGS. 15 and 16 show cross sections, perpendicular to the Z-axis, of the electrode base 111 and the coating layer 112 or 112a, which constitute the anode 11b. The cathode 11a, which is not shown in neither FIG. 15 nor 16, is shifted in the direction +V when viewed from the anode 11b. In FIGS. 15 and 16, surface irregularities of the coating layer 112a are exaggerated.

The method for manufacturing the anode 11b is as follows.

The coating layer 112a is formed at the first side surfaces SS1 (see FIG. 3) of the surface of the electrode base 111, which constitutes the anode 11b, and the first discharge surface DS1, which is the surface facing the cathode 11a, as shown in FIG. 15. The coating layer 112a is formed, for example, by thermal spraying. The step shown in FIG. 15 corresponds to the first step in the present disclosure.

The coating layer 112a is partially removed so as to have a shape closer to a target shape, for example, by grinding or polishing the coating layer 112a, as shown in FIG. 16. The step shown in FIG. 16 corresponds to the second step in the present disclosure.

The coating layer 112 having the shape described in the first embodiment is thus formed. The coating layer 112 having the shape described in the second embodiment or any of the variations thereof may instead be formed.

In the first step shown in FIG. 15, the coating layer 112a has second corners C20. The second corners C20 connect second straight sections S20, which are formed of the side surfaces of the coating layer 112a, to a contour section D20, which is formed of the discharge surface of the coating layer 112a. The first corners C1 may be farther from the position where the cathode 11a is disposed in the V-axis direction than the second corners C20.

In the second step shown in FIG. 16, a portion of the coating layer 112a is so removed that the first corners C1 are closer to the cathode 11a in the V-axis direction than the second corners C2. As described above, in the third embodiment, the positional relationship between the first corners C1 and the second corners C20 or C2 is reversed between the first and second steps.

4.2 Effects

According to the third embodiment, the method for manufacturing the anode 11b of discharge electrodes, includes the first and second steps. The first step includes forming the coating layer 112a at the first side surfaces SS1 out of the surfaces of the electrode base 111, which constitutes the anode 11b, and the first discharge surface DS1, which is the surface facing the cathode 11a of the discharge electrodes. The second step includes partially removing the coating layer 112a so as to have a shape close to the target shape. The second step specifically includes partially removing the coating layer 112a in such a way that the first corners C1 in a cross section perpendicular to the Z-axis are closer to the position where the cathode 11a is disposed in the V-axis direction than the second corners C2.

The configuration described above can suppress the concentration of the electric field in the vicinity of the second corners C2, and therefore reduce the width of the discharge space 50. The discharge is thus stabilized.

As for the other points, the third embodiment is the same as the first embodiment. As for the other points, the third embodiment may instead be the same as the second embodiment or any of the variations thereof.

5. Others

Figure 17:
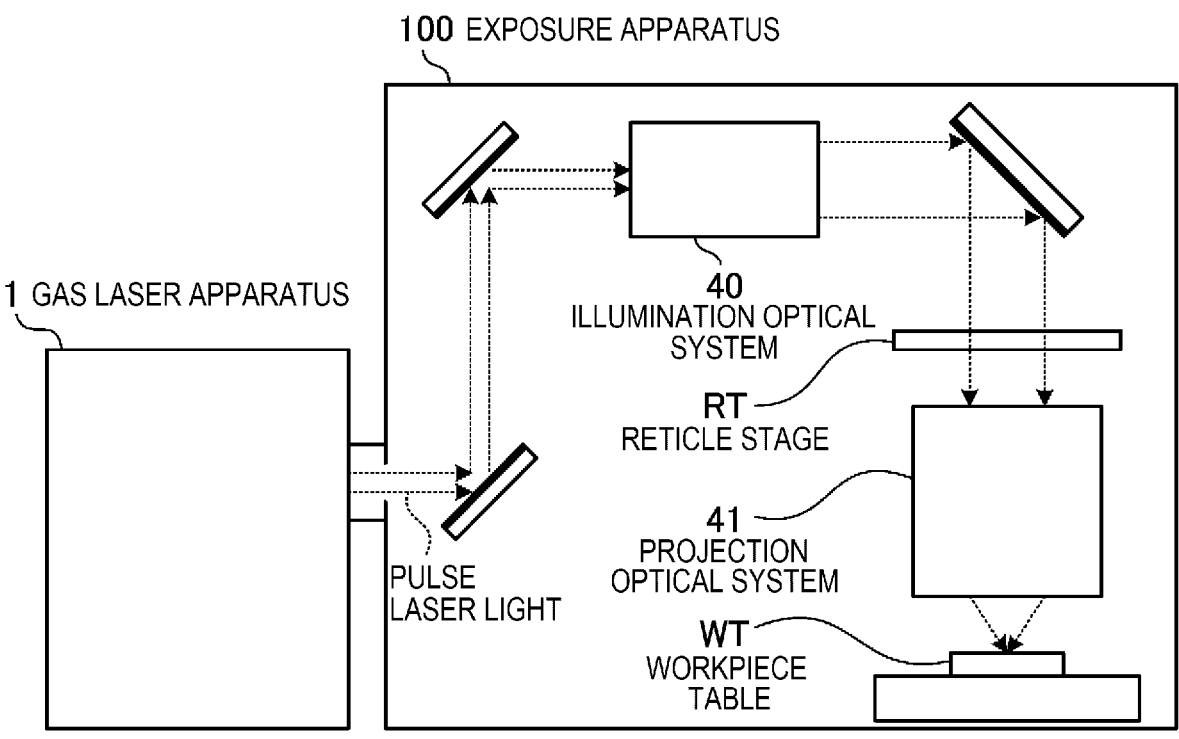
FIG. 17 schematically shows the configuration of an exposure apparatus connected to a gas laser apparatus.

FIG. 17 schematically shows the configuration of an exposure apparatus 100 connected to the gas laser apparatus 1. The gas laser apparatus 1 generates laser light and outputs the laser light to the exposure apparatus 100.

In FIG. 17, the exposure apparatus 100 includes an illumination optical system 40 and a projection optical system 41. The illumination optical system 40 illuminates a reticle pattern of a reticle that is not shown but is placed on a reticle stage RT with the laser light having entered the exposure apparatus 100 from the gas laser apparatus 1. The projection optical system 41 performs reduction projection on the laser light having passed through the reticle to bring the laser light into focus on a workpiece that is not shown but is placed on a workpiece table WT. The workpiece is a photosensitive substrate onto which a photoresist has been applied, such as a semiconductor wafer. The exposure apparatus 100 translates the reticle stage RT and the workpiece table WT in synchronization with each other to expose the workpiece to the laser light having reflected the reticle pattern. The exposure apparatus 100 can manufacture electronic devices by transferring the reticle pattern onto the semiconductor wafer in the exposure step described above and then carrying out a plurality of other steps.

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious for those skilled in the art that embodiments of the present disclosure would be appropriately combined.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of any thereof and any other than A, B, and C.

What is claimed is:

1. Discharge electrodes used in a gas laser apparatus in which a fluorine-containing laser gas is excited by discharge, the discharge electrodes comprising:

a cathode; and an anode, the anode being disposed so as to face the cathode in a discharge direction perpendicular to a longitudinal direction of the cathode, the anode including an electrode base containing metal, and a coating layer that covers a portion of a surface of the electrode base and contains an insulating material, first corners, in a cross section perpendicular to the longitudinal direction, connecting first straight sections formed of first side surfaces that are side surfaces of the electrode base to a first curved section formed of a first discharge surface that is a discharge surface of the electrode base, the first corners being closer to the cathode in the discharge direction than second corners, in the cross section, connecting second straight sections formed of second side surfaces that are side surfaces of the coating layer to a second curved section formed of a second discharge surface that is a discharge surface of the coating layer.

2. The discharge electrodes according to claim 1, wherein the first and second discharge surfaces are each a curved surface convex toward the cathode.

3. The discharge electrodes according to claim 1, wherein a distance in the discharge direction between the first corners and the second corners is greater than or equal to a maximum of a distance in the discharge direction from the first corners to the first curved section.

4. The discharge electrodes according to claim 1, wherein a distance in the discharge direction between the first corners and the second corners is greater than or equal to 0.2 mm.

5. The discharge electrodes according to claim 1, wherein the coating layer contains an insulating material and metal.

6. The discharge electrodes according to claim 1, wherein a length of the coating layer in the discharge direction is greater than or equal to a width of the electrode base in a direction perpendicular to both the longitudinal direction and the discharge direction.

7. The discharge electrodes according to claim 1, wherein a length of the coating layer in the discharge direction is greater than or equal to 4 mm.

8. The discharge electrodes according to claim 1, wherein portions of the coating layer that cover the first side surfaces each have a first thickness at positions at a side of the second corners farther from the cathode but become thinner at the side of the second corners closer to the cathode.

9. The discharge electrodes according to claim 1, wherein portions of the coating layer that cover the first side surfaces each have a first thickness greater than or equal to a thickness of a portion of the coating layer that covers the first discharge surface but smaller than or equal to three times the thickness thereof.

10. The discharge electrodes according to claim 1, wherein portions of the coating layer that cover the first side surfaces each have a first thickness greater than or equal to a thickness of a portion of the coating layer that covers the first discharge surface but smaller than or equal to twice a thickness of the portion thereof.

11. The discharge electrodes according to claim 1, wherein portions of the coating layer that cover the first side surfaces each have a first thickness greater than or equal to 0.1 mm but smaller than or equal to 0.3 mm.

12. The discharge electrodes according to claim 1, wherein portions of the coating layer that cover the first side surfaces each have a first thickness greater than or equal to 0.1 mm but smaller than or equal to 0.2 mm.

13. The discharge electrodes according to claim 1, wherein portions of the coating layer that cover the first side surfaces each have a first region having a first thickness at positions at a side of the second corners farther from the cathode than the second corners and a second region having a second thickness greater than the first thickness at positions at a side of the first region farther from the cathode than the first region.

14. The discharge electrodes according to claim 13, wherein a thickness of the coating layer changes stepwise between the first region and the second region.

15. The discharge electrodes according to claim 13, wherein a thickness of the coating layer changes in such a way that the coating layer is tapered between the first region and the second region.

16. A laser chamber comprising the discharge electrodes according to claim 1.

17. A gas laser apparatus comprising the laser chamber according to claim 16.

18. A method for manufacturing an anode of discharge electrodes used in a gas laser apparatus in which a fluorine-containing laser gas is excited by discharge, the method comprising:

a first step of forming a coating layer at first side surfaces and a first discharge surface out of surfaces of an electrode base that constitutes the anode, the first discharging surface facing a cathode of the discharge electrodes; and a second step of partially removing the coating layer in such a way that a shape of the coating layer approaches a target shape, the second step including partially removing the coating layer in such a way that first corners in a cross section perpendicular to a longitudinal direction of the cathode are closer to a position where the cathode is disposed in a discharge direction of discharge between the anode and the cathode than second corners in the cross section, the first corners connecting first straight sections formed of the first side surfaces to a first curved section formed of the first discharge surface, the second corners connecting second straight sections formed of second side surfaces that are side surfaces of the coating layer to a second curved section formed of a second discharge surface that is a discharge surface of the coating layer.

19. The manufacturing method according to claim 18, wherein the first step is used to form the coating layer in such a way that the first corners are farther from the position where the cathode is disposed in the discharge direction than the second corners.

20. A method for manufacturing electronic devices, the method comprising:

generating laser light by using a gas laser apparatus including a laser chamber including discharge electrodes used in the gas laser apparatus, in which a fluorine-containing laser gas is excited by discharge, the discharge electrodes including a cathode, and an anode, the anode being disposed so as to face the cathode in a discharge direction perpendicular to a longitudinal direction of the cathode, the anode including an electrode base containing metal, and a coating layer that covers a portion of a surface of the electrode base and contains an insulating material, first corners, in a cross section perpendicular to the longitudinal direction, connecting first straight sections formed of first side surfaces that are side surfaces of the electrode base to a first curved section formed of a first discharge surface that is a discharge surface of the electrode base, the first corners being closer to the cathode in the discharge direction than second corners, in the cross section, connecting second straight sections formed of second side surfaces that are side surfaces of the coating layer to a second curved section formed of a second discharge surface that is a discharge surface of the coating layer;

outputting the laser light to an exposure apparatus; and exposing a photosensitive substrate to the laser light in the exposure apparatus to manufacture the electronic devices.

\* \* \* \* \*